United States Patent [19]

Hauser et al.

[11] 4,028,960
[45] June 14, 1977

[54] TRANSMISSION SHIFT MECHANISM

[75] Inventors: Hans Hauser; Ronald N. Jones, both of Fredericktown, Ohio

[73] Assignee: The J. B. Foote Foundry Co., Fredericktown, Ohio

[22] Filed: June 23, 1975

[21] Appl. No.: 589,479

[52] U.S. Cl. .................................. 74/477; 74/473 R; 74/475

[51] Int. Cl.² .................. G05G 13/00; B60K 20/08

[58] Field of Search ............... 74/473 R, 474, 475, 74/476, 477, 375

[56] References Cited

UNITED STATES PATENTS

| | | | |
|---|---|---|---|
| 3,180,174 | 4/1965 | Walter | 74/475 |
| 3,301,080 | 1/1967 | Musgrave | 74/375 |
| 3,426,611 | 2/1969 | Hauser | 74/475 |
| 3,457,798 | 7/1969 | Musgrave | 74/475 X |
| 3,520,208 | 7/1970 | Davis et al. | 74/473 R |
| 3,563,110 | 2/1971 | Hauser | 74/473 R |
| 3,665,775 | 5/1972 | Freeman | 74/473 R |
| 3,874,248 | 4/1975 | Hauser et al. | 74/473 R X |

Primary Examiner—Samuel Scott
Assistant Examiner—Lance W. Chandler
Attorney, Agent, or Firm—Allen D. Gutchess, Jr.

[57] ABSTRACT

A transmission with multiple forward speeds and an improved shifting arrangement is provided. The transmission is particularly adapted for use on riding lawn mowers, garden tractors, and the like. The shift mechanism includes a pivotable shift lever which requires the operator to interrupt the motion of the lever when shifting from neutral to reverse and from neutral to successive forward speeds. This enables the operator to know by feel what gear the transmission is in. The transmission can also be quickly shifted from reverse to neutral or from any forward speed down to or toward neutral without interruption. The pivotable shift lever is located outside a cover of the transmission and is mechanically connected through the cover with an internal shift lever or arm which engages a pawl pivotally mounted on a carrier, with a stop member being engageable by the pawl to control the movement of the carrier, the pawl, and the levers. A shifter fork is located within the housing and projects through a slot in the housing, which slot is positioned transversely to the path of the carrier and in turn is engageable with a transverse slot in the carrier itself. The shifter fork moves a shift collar which is connected to two diametrically-opposed key carriers in two diametrically-opposed grooves in a shaft of the transmission. The carriers have individual keys for individual forward speed gears of the transmission. The ends of the carriers can engage an additional forward speed gear when moved to their extremities and the shift collar can engage a gear or sprocket for reverse when moved in the opposite direction along the shaft.

28 Claims, 16 Drawing Figures

TRANSMISSION SHIFT MECHANISM

This invention relates to a transmission and more particularly to a small transmission having several forward speeds and reverse.

The transmission embodying the invention includes a shift lever movable in a generally lineal or arcuate path in order to shift the transmission from neutral to reverse and from neutral up through several forward speeds. The shift mechanism requires the operator to interrupt the movement of the shift lever in order to shift from neutral to reverse or from neutral through the next set of forward speed gears. The manipulation of the shift lever is uniform so that the shifting can be accomplished quickly and with minimum skill and yet the operator knows by feel what gear the transmission is in. In addition, the shift lever can be manipulated without interruption back to or toward neutral from any in-gear position.

The shift mechanism includes a shift lever located externally of the transmission and specifically above a cover thereof. The shift lever is removable mechanically connected through the cover to an internal shift lever or arm. The internal lever engages a pawl which is pivotally mounted on a carrier or slide which is guided along a predetermined path on the top of the transmission housing, but below the cover. A stop member is located along the path of th carrier and is engaged by the pawl to limit the extent of movement of the carrier, the pawl, and both the internal and external shift levers.

An internal shifter fork has a projection or stem extending upwardly through a slot in the transmission housing, which slot is located transversely to the path of the carrier. The stem also extends through a slot in the carrier itself which is located transversely to the carrier path and is also located transversely to the first slot. The carrier thereby controls the position of the stem as it is moved along its path with the stem in turn controlling the position of the shifter fork within the transmission housing.

The shifter mechanism within the housing which is operated through the shifter fork is generally of the draw-key type having multiple keys. A shaft in the housing has a plurality of toothed members in the form of gears and sprockets rotatably mounted thereon. The shaft also includes a pair of diametrically-opposite, longitudinally-extending channels or grooves in which key carriers are located, each of which carries a plurality of projections or keys, preferably one less than the number of forward speed gears. The keys are spaced apart predetermined distances so that only one key can engage one gear in any given longitudinal position of the key carrier on the shaft. The ends of the carriers can engage a final forward speed gear to eliminate the need for a key for that gear. The key carriers are moved longitudinally of the shaft by a collar rotatably mounted on the shaft and engaged by the shifter fork. The collar also has dogs on the side thereof opposite the key carriers which engage the reverse gear or sprocket for the transmission, thereby eliminating the need for a key for that member. Consequently, by way of example, for a three forward speed transmission with reverse, only two keys or two pair of keys are needed.

It is, therefore, a principal object of the invention to provide a shift arrangement for a transmission having separate internal and external shifting levers and having a number of individual keys equal to the number of in-gear positions of the transmission less two.

Another object of the invention is to provide a shift mechanism for a transmission which requires an interruption of motion when shifting from neutral to reverse and from neutral to forward speeds and requires fewer individual keys for the transmission gears or driven members.

Many other objects and advantages of the invention will be apparent from the following detailed description of a preferred embodiment thereof, reference being made to the accompanying drawings, in which:

Figure 1:
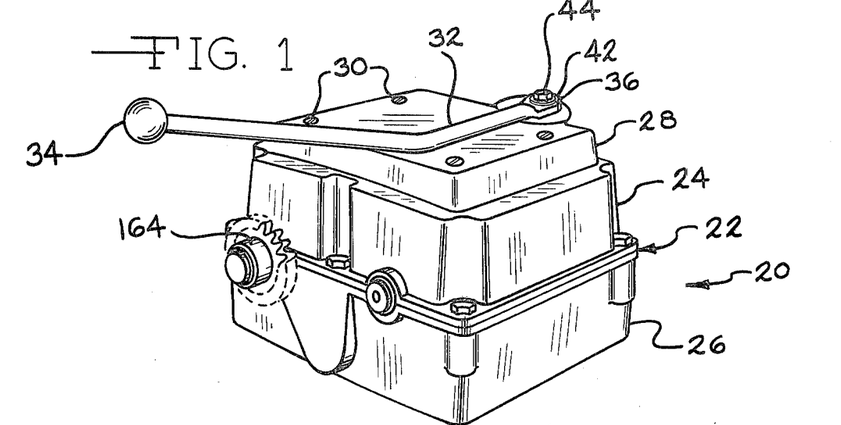
FIG. 1 is a somewhat schematic view in perspective of a transmission embodying the invention.

Referring to the drawings, and particularly to FIG. 1, a transmission embodying the invention is indicated at 20 and includes a housing 22 having an upper half 24 and a lower half 26. A cover 28 is mounted on the upper half 24 and is affixed by four screws or other suitable fasteners 30. An external shift lever 32 extends across the top of the cover 28 and curves upwardly to a handle 34. The lever 32 also has a flattened end 36 with a noncircular opening which fits on a noncircular shank or projection 38 of a vertical shaft 40. The shaft is pivotally mounted in the upper housing half 24 and extends through an opening in the cover 28. The lever 32 is affixed to the shank 38 by a washer 42 and a threaded fastener 44. With this arrangement, the lever 32 can be removed and replaced by another lever, if desired. Further, the transmissions 20 can be shipped without the levers 32 so that substantially less space is required. Also, the manufacturer of the mower, garden tractor, or the like with which the transmission 20 will be employed can design a lever of any desired configuration to fit his particular requirements.

Figures 2, 5:
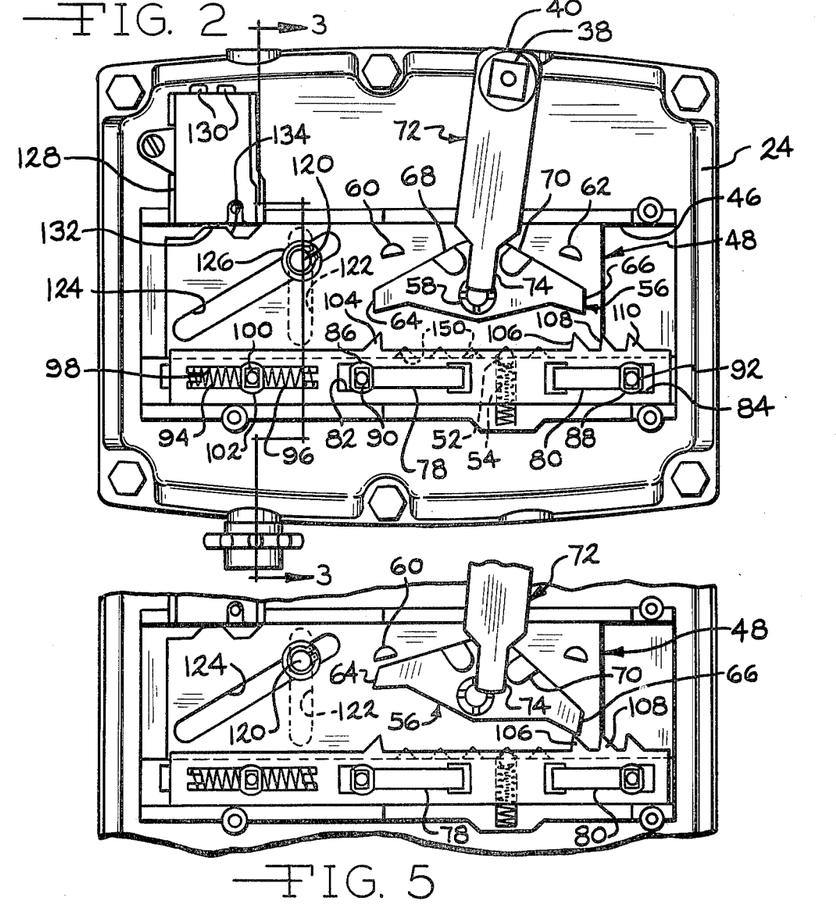
FIG. 2 is an enlarged plan view of the transmission of FIG. 1 with an external shift lever and cover removed.
FIGS. 5–7 are fragmentary, plan views showing the shift mechanism of FIG. 2 in three successive shifting positions.

Referring to FIG. 2, the upper housing half 24 forms an elongate recess or track 46 in which a pawl carrier or slide 48 is positioned and guided for movement along a longitudinal path. A plurality of notches 50 are formed in one longitudinal edge of the carrier 48, there being five of the notches in this instance to correspond to three forward speeds, one reverse speed, and one neutral position of the transmission. The transmission as viewed in FIG. 2 is in the neutral position.

A ball or projection 52 is urged outwardly into one of the recesses 50 by a spring 54 located in a suitable bore in the upper housing half 24 to hold the carrier in the appropriate one of its positions along the lineal path.

A pawl 56 is mounted on the carrier 48 by a suitable pivot pin 58 and moves with the carrier 48 along its path in the recess 46. The extent of pivotal movement of the pawl 56 relative to the carrier 48 is limited by stops 60 and 62 projecting upwardly from the carrier 48. The pawl 56 has two end dogs 64 and 66 which pivot about the pin 58 and has two upwardly-extending projections 68 and 70 which are disposed on each side of a center line extending through the pin 58.

A shift lever or arm 72 has a reduced end 74 extending between the projections 68 and 70 with the opposite end of the lever 72 being affixed to the shaft 40 to move therewith.

Figures 3, 4:
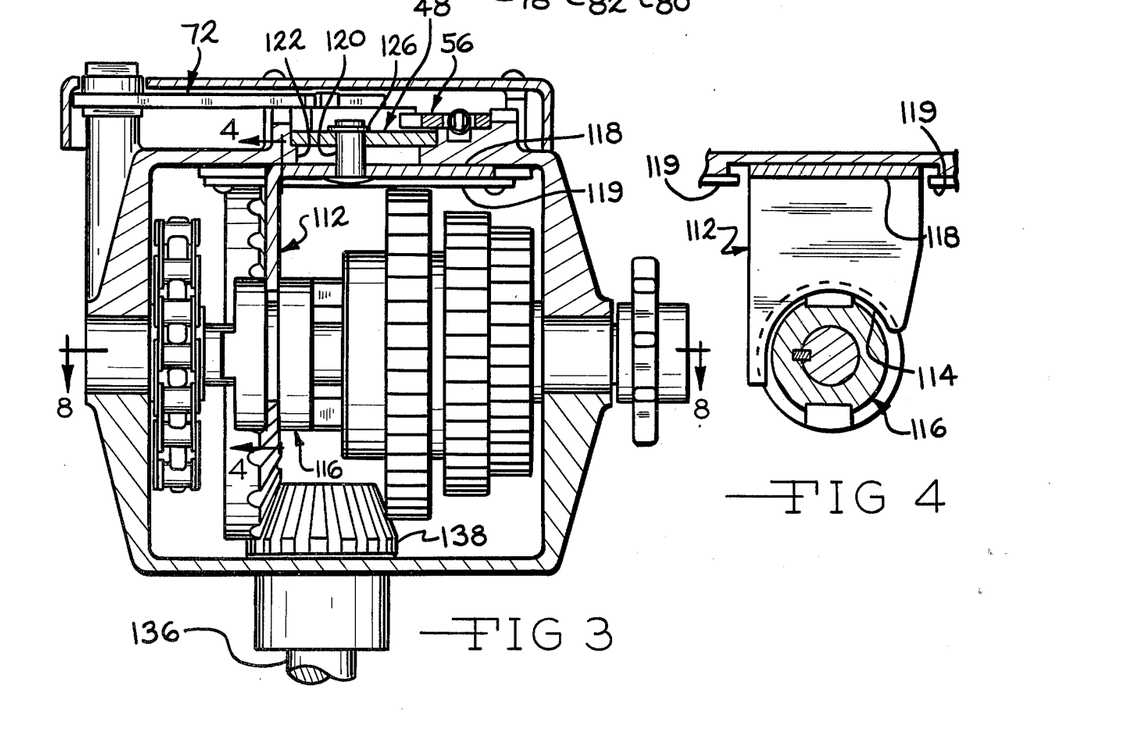
FIG. 3 is a view in vertical, transverse cross section of the transmission, taken along the line 3—3 of FIG. 2.
FIG. 4 is a fragmentary, detail view of a shifter fork, taken along the 4—4 of FIG. 3.

A stop member 76 is mounted for longitudinal movement on the upper housing half 24 in the plane of the pawl 56, as shown in FIGS. 2 and 3. Two rectangular projections 78 and 80 extend upwardly from the upper housing half 24 through generally rectangular openings 82 and 84 in the stop member 76. Push nuts or other suitable means 86 and 88 are located on top of pins 90 and 92 extending upwardly beyond the projections 78 and 80. The cooperation of the rectangular openings 82 and 84 and the rectangular projections 78 and 80 guides the stop member 76 in a longitudinal path parallel to the recess 46 and the path of the pawl carrier 48. The limit of movement of the stop member 76 is determined by the distance between the ends of the projections 78 and 80 and the ends of the rectangular openings 82 and 84. The stop member 76 is urged toward a central position with the projections in the center of the openings by virtue of springs 94 and 96 located in an opening 98 in the stop member and positioned between the ends of the opening 98 and an additional projection or pin 100 which also has a push nut 102.

A forward edge of the stop member 76 has a plurality of engagable teeth thereon. These include oppositely-facing teeth 104 and 106 which correspond to the neutral position of the transmission, and two additional teeth 108 and 110 which correspond to the first and second forward speed positions of the transmission. No tooth is required for reverse or the third forward speed, as will be apparent subsequently.

Referring to FIG. 3, shifting means in the form of a shifter fork 112 is located within the housing 22 and has a lower arcuate edge 114 engaging a shift collar 116 which will be discussed more fully subsequently. The shifter fork 112 has an upper horizontally-extending plate 118 supported immediately below the upper wall of the upper housing half 24 straps 119. The plate 118 carries an upright pin or stem 120 which extends upwardly through a slot 112 located in the upper wall of the housing half 24. This slot extends transversely, and preferably substantially perpendicularly to the path of the pawl carrier 48. The pin 120 also extends upwardly through a transverse slot 124 in the carrier 48. The slot 124 is also positioned transversely to the path of the carrier 48 as well as being positioned transversely to the slot 122. A snap ring 126 holds the pin 120 in position relative to the carrier 48. As the carrier moves longitudinally in its path, the pin 120 is moved along the carrier slot 124 as well as along the housing slot 122. This motion causes the shifter fork 112 to move transversely and substantially perpendicular to the path of the carrier 48 and thereby move the shifter fork 112 and the shift collar 116.

The operation of the shift mechanism will now be set forth, with reference to FIGS. 2 and 5–7 in particular. The components are shown in the neutral position in FIG. 2 with the ball 52 engaged in the notch 50 which is second from the right. If it is desired to shift into the first forward speed gear, the lever 32 is moved in a counterclockwise direction and the pawl 56 is moved beyond the tooth 106 to move the carrier 48 toward the right and to move the ball 52 into the next of the notches 50 to the left of the neutral one. To accomplish this, as the lever 72 is moved counterclockwise, the narrow end 74 first engages the projection 70 to rotate the pawl 56 about the pin 58 in a clockwise direction with the end 66 moving beyond the tooth 106, as shown in FIG. 5. Continued movement of the lever 72 moves the 56 against the stop 60, as viewed in FIG. 6, to stop the pivotal movement of the pawl. Further movement of the lever 72 then moves the carrier 48 toward the right and moves the pin 120 in a downward direction in the slot 122 to cause the shifter fork 112 to move the collar 116 toward the right, as viewed in FIG. 3. This places the transmission in the first forward speed position, as will be discussed subsequently.

Figure 6:
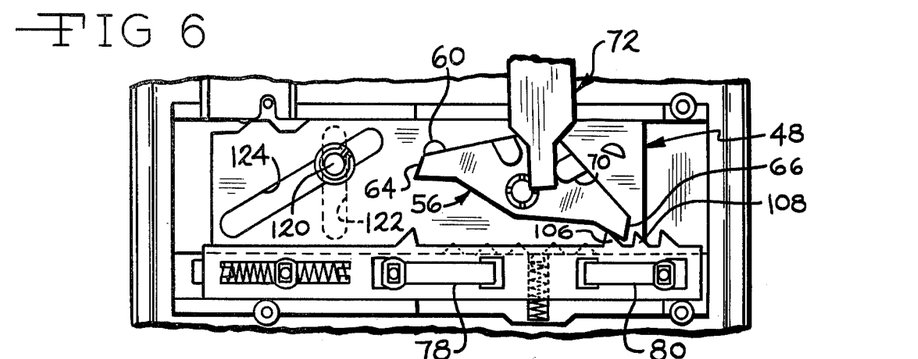
Figure 7:
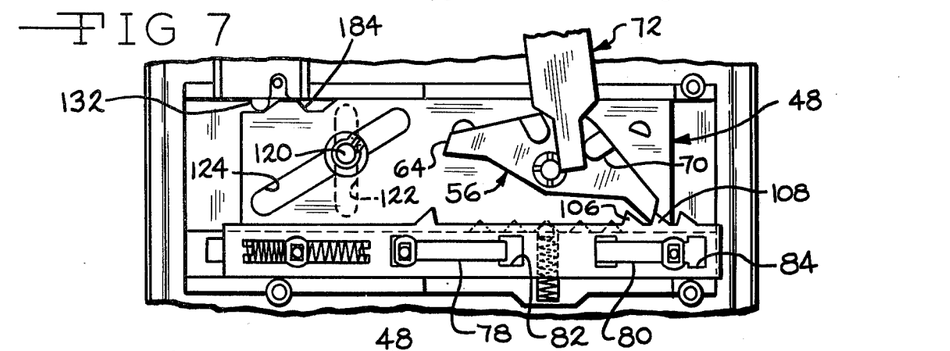

During the movement of the carrier 48 toward the right, the ball 52 first disengaged from the neutral notch 50, as shown in FIG. 6. The dog 66 of the pawl 56 subsequently engages the tooth 108 and forces the stop member 76 toward the right until the rectangular projections 78 and 80 contact the left ends of the openings 82 and 84. At this time, the ball 52 is in the next notch and the transmission is shifted into first. No further shifting can then occur until the shift lever 32 is released and moved backward slightly to cause the lever 72 to engage the projection 68 to move the pawl 56 in the opposite direction and move the end dog 66 out away from the tooth 108. When the pawl 56 has moved out, the springs 94 and 96 will move the stop member 76 back to the original position of FIG. 2 so that further movement of the shift lever 72 in the counterclockwise direction will move the pawl 56 down into engagement with the next tooth 110 and move the carrier to the second forward speed position by the time the stop member 76 reaches the limit of its movement in the same direction again.

When the transmission is to be shifted from the second forward speed to the third forward speed, no tooth is required because a positive stop is incorporated into the gear train, as will be discussed subsequently. The same is true for shifting from neutral to the reverse gear. To shift into reverse, the shift lever 32 is moved in a clockwise direction as viewed in FIGS. 1 and 2 to move the lever 72 which moves the pawl 56 beyond the tooth 104 and shifts the carrier 48 into reverse with the ball 52 then being in the right end notch 50.

The transmission can be shifted from any forward speed back to or toward neutral and from reverse to neutral without interruption of the motion of the shift lever 32. During such motion, the dogs 64 and 66 of the pawl 56 simply ride along the straight portion of the stop member 76 between the teeth 104 and 106.

As shown in FIG. 2, a safety switch 128 is provided to prevent an engine associated with the vehicle on which the transmission 22 is employed to start unless the transmission is in neutral. The switch has a pair of terminals 130 which are connected into an ignition circuit and render starting of the engine impossible unless the switch 128 is closed and the terminals 130 are electrically connected together. A plunger 132 extends from the switch and closes the circuit when pushed in by a projection 134 on the carrier 48. When the plunger 132 extends outwardly on either side of the projection 134, the circuit is opened and disconnected to prevent the engine from being started in such position. Hence, the switch 128 is closed only when the transmission is neutral and the plunger 132 is pushed in by the carrier projection 134.

From the above, it will be seen that by the use of the external shift lever 32 and the internal shift lever 72, the transmission remains closed and the cover 28 protects the shift mechanism from dirt and the like. With the removable shift lever 32, the transmission can be easily shipped and stored and the mower manufacturer can design his own lever to meet his particular requirements. The transverse slot and pin arrangement for the shifter fork motion also minimizes the chance of dirt entering through the top of the upper housing half 24 and into the interior of the housing.

Figures 8, 9, 10, 11:
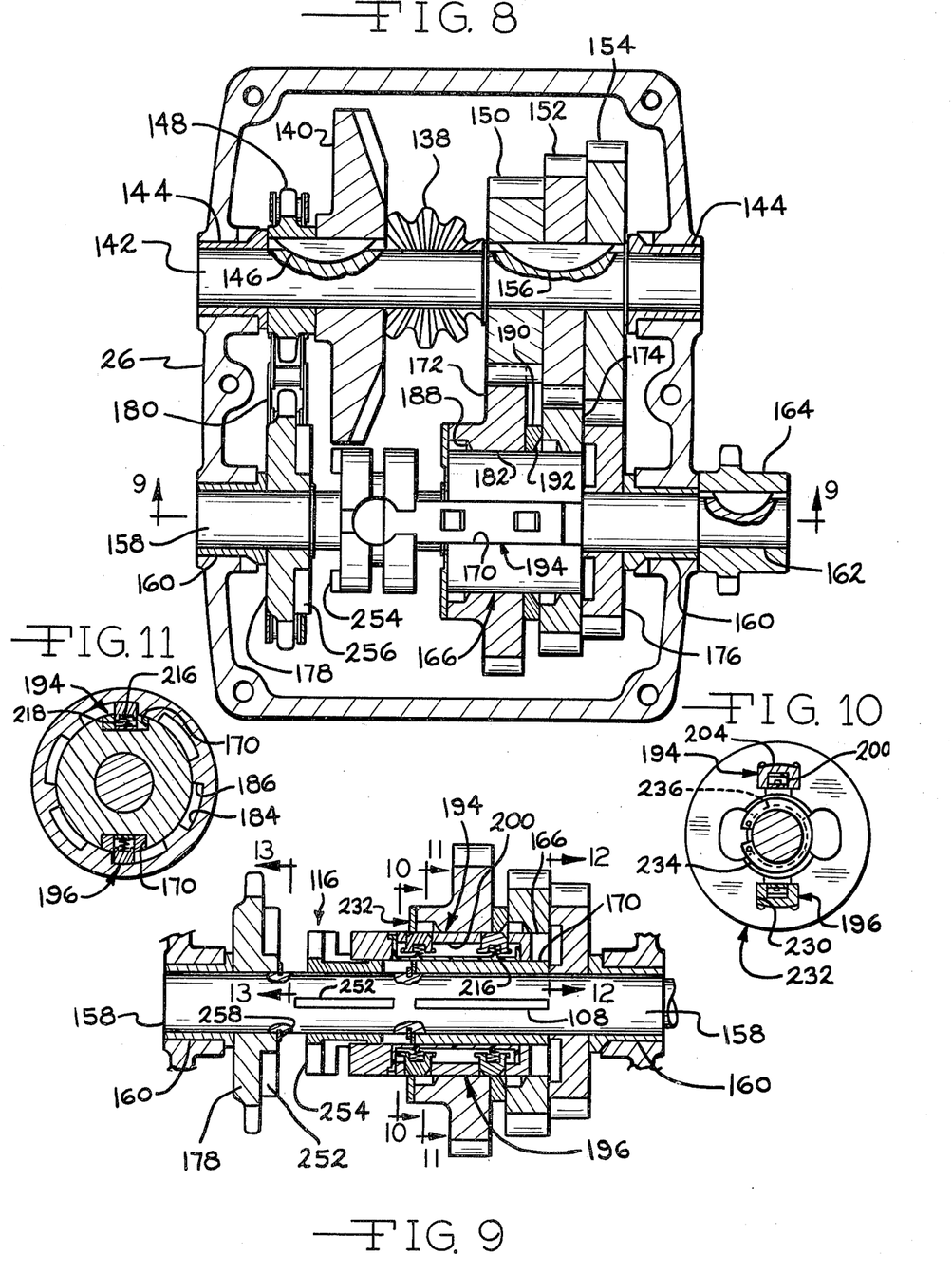
FIG. 8 is a view in horizontal cross section of the transmission, with parts broken away, taken along the line 8—8 of FIG. 3.
FIG. 9 is a view in longitudinal cross section, taken along the line 9—9 of FIG. 8.
FIG. 10 is a detail view transverse cross section taken along the line 10—10 of FIG. 9.
FIG. 11 is a detail view in transverse cross section taken along the line 11—11 of FIG. 9.

Referring now more particularly to the drive train of the transmission, the transmission includes an input shaft 136 (FIG. 3) extending through the bottom half 26 of the housing to a bevel gear 138 (FIGS. 3 and 8). This meshes with a central driven bevel gear 140 on an intermediate shaft 142 which is rotatably mounted in bearings 144. The bevel gear 140 is affixed to the shaft 142 by a key 146 which also affixes a reverse sprocket 148 to the intermediate shaft. Three forward speed gears 150-154 are also affixed to the shaft 142 through a key 156.

Output shaft means includes an output 158 rotatably mounted in the housing 22 by bearings 160. An output gear or sprocket 162 is keyed to an external end of the shaft 158 (FIGS. 1 and 8). The output shaft means also includes a cylindrical sleeve 166 located in the shaft 158 and affixed thereto by a key 168 (FIG. 9). The sleeve also has two diametrically-opposite, longitudinally-extending grooves or channels 170 therein. A driven first forward speed gear 172 and a driven second forward speed gear 174 are rotatably mounted on the output shaft means and specifically on the sleeve 166 and mesh with the gears 150 and 152, respectively. A driven third forward speed gear 176 is located on the output shaft means and specifically directly on the output shaft 158 beyond an end of the sleeve 166. A reverse gear or sprocket 178 is also rotatably mounted on the output shaft means, and specifically directly on the shaft 158 near the opposite end, and is connected to the reverse drive sprocket 148 through a suitable chain 180.

The first and second forward speed gears 172 and 174 have substantially identical hub designs. As shown in FIGS. 8, 9, and 11, the first forward speed gear 172 has a solid hub 182 extending through a substantial portion of its thickness. Adjacent the hub 182, the gear has six arcuate recesses or notches 184 formed by six engagable means or dogs 186. The forward speed gears 172 and 174 also have inner, annular beveled or conical surfaces 188 between the arcuate recesses and the solid hubs. An annular spacer 190 located between the gears 172 and 174 also has an annular beveled inner surface 192 facing the beveled surface of the second gear 174.

Mechanism for individually engaging the first two forward speed gears 172 and 174 will now be discussed. Accordingly, two key carriers 194 and 196 are located in the channels 170 of the sleeve 166 on opposite sides of the output shaft 158. Each of the carriers 194 and 196 has a longitudinally-extending bottom channel or recess 200 with rectangular openings 202 extending outwardly from the recess to an outer arcuate surface 204. This surface, in effect, forms a continuation of the cylindrical surface of the sleeve 166 when the carriers are in the channels 170. Two projections or keys 206 and 208 extend outwardly through the rectangular openings 202 and are spaced apart predetermined distances by the openings. The spacing of the keys 206 and 208 is designed so that only one can engage one of the forward speed gears 172 and 174 at any one time as the carriers 194 and 196 move longitudinally. By employing two of the carriers and keys on the shaft, one pair of keys engages each gear simultaneously to distribute stress and wear. However, it is not essential that two be employed in order for the transmission to be functional.

Each of the keys 206 and 208 has beveled corner surfaces 210 and 212 facing in opposite directions so as to be urged downwardly when engaging the conical or beveled surfaces 188 of the gears 172 and 174 and when engaging the beveled surface 192 of the spacer 190. Each of the keys 206 and 208 also has lower outwardly-extending flanges 214, the extremities of which exceed the corresponding dimension across the rectangular openings 202 to constitute stop means which limit outward movement of the keys relative to the carrier.

As shown in FIGS. 9 and 11, each of the keys also has a bottom recess 216 which receives an upper end of a coil spring 218. The lower end of each of the springs 218 is received over a seating hub 220 of a spring retaining member 222. The retaining member 222 extends the length of the elongate recess 200, having an end flange 222 which fits into a contoured portion of the carrier 194 and also having an end flange 224 which abuts the end of the recess 200 in the carrier (see FIG. 9). The springs 218 normally urge the keys 206 and 208 toward their outer positions with the upper, beveled corners 210 and 212 extending above the arcuate surface 204 of each of the carriers 194 and 196. When the carriers move longitudinally relative to the sleeve 166, the cooperation of the beveled corners of the keys and the surfaces 188 of the gears and the surface 192 of the spacer 190 easily moves the keys downwardly flush with the surface 204. It is not essential, however.

Figure 12:
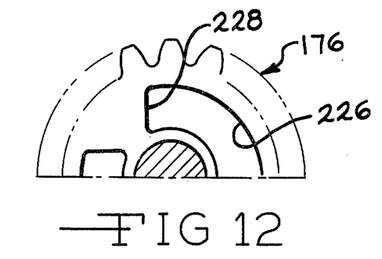
FIG. 12 is a fragmentary view in transverse cross section of the third forward speed gear of the transmission, taken along the line 12—12 of FIG. 9.

In order to engage the third forward speed gear 176, this gear has arcuate recesses 226 (FIG. 12) formed therein and separated by dogs 228. When the carriers 194 and 196 are moved sufficiently far to the right, their ends enter the arcuate recesses 226 and engage the dogs 228 to drive the shaft through the third forward speed gear 176. This eliminates the need for a third set of the keys to accomplish this engagement and correspondingly reduces the cost of the carriers 194 and 196. Of course, during this engagement, both of the keys 206 and 208 are out of engagement with the forward speed gears 172 and 174.

Referring particularly to FIG. 10, the key carriers 194 and 196 extend through generally rectangular openings 230 in a retaining ring 232 which is held against an end of the sleeve 166 by a snap ring 234 positioned in a circular groove 236 in the output shaft 158. The snap ring and the retaining ring 232 thereby prevent the sleeve 166 from moving longitudinally toward the left on the shaft 158. Movement toward the right is limited by the third forward speed gear 176 which is backed up by the sleeve bearing 160.

Figure 16:
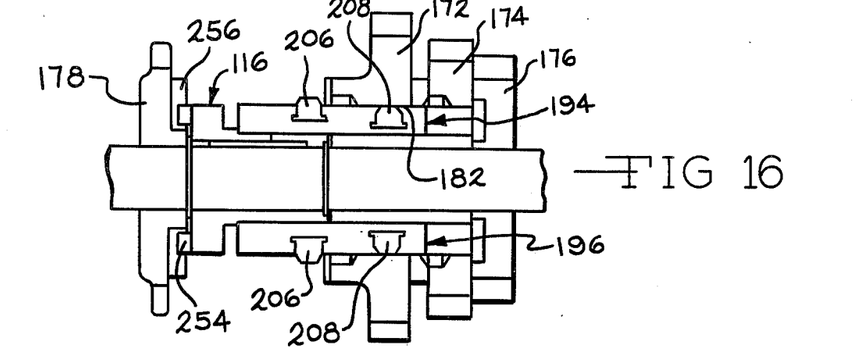

In order to shift the carriers 194 and 196, each is provided with end notches 238, as best shown in FIG. 16, forming an end tongue 240. The clutch collar 116 has notches 242 with a central cylindrical recess 242 communicating therewith to receive the end tongue 240. The notches 242 and the cylindrical recess 244 are shaped as shown primarily for manufacturing ease. Various other shapes of tongues and recesses for the collar 116 could be employed to achieve the desired purpose. The clutch collar 116 also has an annular grove 246 therein which received the arcuate edge 114 of the shifter fork 112. A longitudinally extending cylindrical center bore 248 in the collar receives the output shaft 158 with a longitudinal groove 250 receiving a key 252 (FIG.9) to mount the clutch collar 116 on the output shaft 158 along with the sleeve 116.

Figure 13:
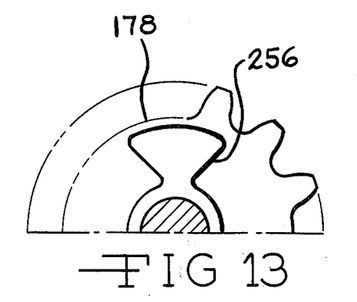
FIG. 13 is a fragmentary view in transverse cross section of a reverse sprocket of the transmission, taken along the line 13—13 of FIG. 9.
Figure 14:
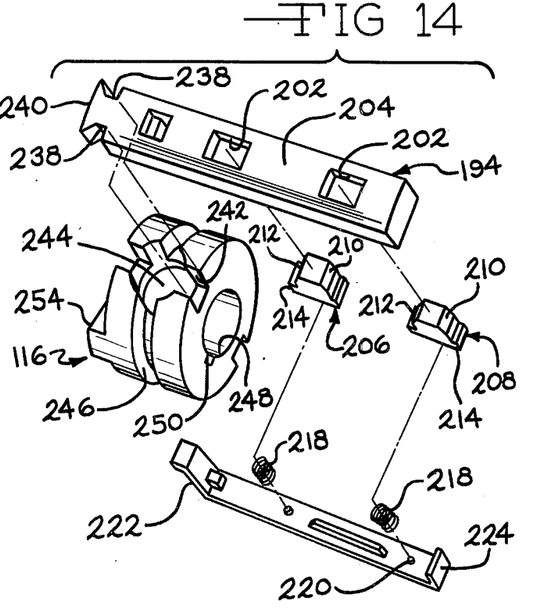
FIG. 14 is an exploded view in perspective of a key carrier and shift collar of the transmission.

The clutch collar in this instance also is equipped with two diametrically-opposite projecting dogs 254 which extend toward the reverse sprocket 178. As shown in FIG. 13, the reverse sprocket has dogs 256 extending toward the clutch collar 116. When the clutch collar is moved a sufficient distance toward the reverse sprocket 178, the dogs 254 engage the dogs 256 to drive the output shaft 158 from the reverse sprocket 178, at which time the forward speed gears are disengaged. This arrangement eliminates the need for a second pair of carriers or other additional keys, to further reduce manufacturing costs of the transmission. The reverse sprocket 178 is held against longitudinal movement on the output shaft 158 by a retaining ring 258 located in a groove on the shaft and also by the bearing 160.

The overall operation of the engagement of the forward and reverse gears and sprocket with the output shaft 158 will now be discussed. When the shifter fork 112 and the clutch collar 116 are in neutral, the clutch collar dogs 254 are spaced from the reverse sprocket dogs 256 as shown in FIGS. 8 and 9. The keys 206 are also held out of engagement with the first forward speed gear 172 by the retaining ring 232 and the keys 208 are held out of engagement with the second forward speed gear 192 by the spacer 190 and a portion of the solid hub 182 of the first gear 172. The ends of the carriers 194 and 196 are also spaced from the dogs 228 of the third forward speed gear 176. Hence, there is no mechanical connection between any of the toothed members, including the three forward speed gears 172-176 and the reverse sprocket 178 and the output shaft 158.

Figure 15:
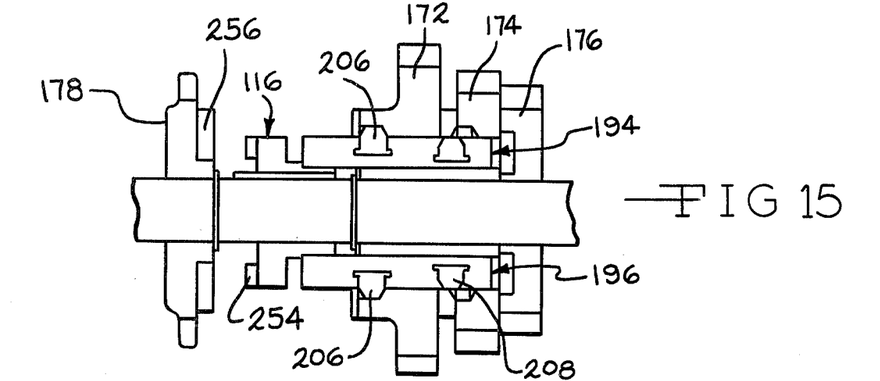
FIGS. 15 and 16 are schematic views in longitudinal section showing the shift components of FIG. 9 in different positions.

If the clutch collar 116 is now moved to the first forward speed position by the shifter fork 112, the carriers 194 and 196 are moved sufficiently to the right to enable the first pair of the keys 206 to enter the arcuate recesses 184 and engage the projections 186 of the first forward speed gear 172, the second set of the keys 208 still being held down and out of engagement with the second forward speed gear 174 by the spacer 190, as shown in FIG. 15. It will be readily understood that further movement to the right of the carriers 194 and 196 will enable the keys 208 to enter the arcuate recesses and engage the dogs of the second forward speed gear 174 and at the same time the first keys 206 are forced downwardly and out of engagement with the gear projections by the beveled annular surface 188 of the first forward speed gear. Likewise, further movement to the right of the carriers 194 and 196 will cause the end of the carriers to engage the dogs 228 of the third forward speed gear 176. At the same time, the keys 208 will be cammed downwardly by the beveled surfaces of the second forward speed gear 174 and the first keys 206 will remain held downwardly by the solid hub 182 of the first forward speed gear 172.

When the clutch collar 116 is moved far enough to the left, the clutch dogs 254 engage the reverse sprocket dogs 256 of the reverse sprocket 178, as shown in FIG. 16, to place the output shaft 158 in reverse. At the same time, the first keys 206 are separated completely from the first forward speed gear 172 and the seond keys 208 are now held downwardly by the solid hub 182 of the first forward speed gear 172.

Various modifications of the above-described embodiment of the invention will be apparent to those skilled in the art and it is to be understood that such modifications can be made without departing from the scope of the invention, if they are within the spirit and the tenor of the accompanying claims.

We claim:

1. A transmission comprising a housing, a cover on said housing, movable shift means pivotally mounted on said housing within said cover, a pawl carrier movable in a path and having a plurality of positions corresponding in number to the number of in-gear and neutral positions of the transmission, pawl means movably mounted relative to said carrier and engagable by said shift means for movement relative to said carrier, stop means for limiting continuous movement of said pawl carrier in one direction, a shift lever removably connected with said movable shift means and located outside said cover for moving said movable shift means, said pawl carrier, and said pawl means, a plurality of toothed members within said housing, and means responsive to the position of said carrier for individually connecting said toothed members with input and output shafts of said transmission.

2. A transmission according to claim 1 characterized by said shift lever being connected with said movable shift means through an opening in said cover.

3. A transmission according to claim 2 characterized by said movable shift means including a noncircular projection extending through said cover, and said shift lever having a noncircular opening cooperating with said projection.

4. A transmission according to claim 3 characterized by said shift lever being connected to said movable shift means by a threaded fastener.

5. A transmission according to claim 1 characterized by said pawl carrier having a slot therein positioned transversely to the path of the carrier, and said responsive means comprising projecting means extending into said slot.

6. A transmission according to claim 5 characterized by said housing having a slot therein positioned transversely to the path of said carrier and said projecting means also extending through said housing slot.

7. A transmission according to claim 1 wherein said responsive means comprises a key carrier, a plurality of keys carried by said key carrier, a collar for moving said key carrier to selectively engage said keys with some of said toothed members, said collar also having means for engaging an additional one of said toothed members.

8. A transmission according to claim 7 characterized by another one of said toothed members having means positioned to be engaged by an end of said key carrier for connecting said another toothed member with the input and output shafts of said transmission.

9. A transmission comprising a housing, movable shift means, a pawl carrier movable in a path and having a plurality of positions corresponding in number to the number of in-gear and neutral positions of the transmission, pawl means movably mounted relative to said carrier and engagable by said shift means for movement relative to said carrier, a shifter fork within said housing, said fork having projecting means extending through said housing and engagable in a slot in said carrier which is located transversely to the direction of movement of said carrier, a shaft within said housing, a plurality of toothed members rotatably carried on said shaft, and means engagable by said shifter fork for individually connecting said toothed members and said shaft.

10. A transmission according to claim 9 characterized by said housing havng a slot extending substantially perpendicularly to the path of said pawl carrier through which said projecting means extends.

11. A transmission according to claim 9 characterized by a cover on said housing, a shift lever located outside said cover, and means for removably connecting said shift lever to said movable shift means for moving same.

12. A transmission according to claim 11 characterized by said shift lever being connected with said movable shift means through an opening in said cover.

13. A transmission according to claim 12 characterized by said movable shift means including a noncircular projection extending through said cover, and said shift lever having a noncircular opening cooperating with said projection.

14. A transmission according to claim 13 characterized by said shift lever being connected to said movable shift means by a threaded fastener.

15. A transmission according to claim 9 wherein said last-named means comprises a key carrier, a plurality of keys carried by said key carrier, a collar for moving said key carrier to selectively engage said keys with some of said toothed members, said collar also having means for engaging an additional one of said toothed members.

16. A transmission according to claim 15 characterized by another one of said toothed members having means positioned to be engaged by an end of said key carrier for connecting said another toothed member with the input and output shafts of said transmission.

17. A transmission comprising a housing, shaft means rotatably mounted in said housing and having longitudinally-extending guide means, a plurality of toothed members rotatably supported on said shaft means, each of said members having engagable means, a key carrier, a plurality of spaced keys carried by said carrier, each of said keys being engagable with the engageable means of one of said toothed members to cause that member to rotate with said shaft means when so engaged, means for moving said keys and said key carrier along said guide means, said moving means comprising a clutch mounted for movement longitudinally of said shaft, an additional toothed member rotatably supported on said shaft means on the side of said collar opposite said plurality of toothed members, said additional toothed member having engageable means, and said collar having engageable means engageable with said additional toothed member engageable means when moved toward said additional toothed member and away from said plurality of toothed members.

18. A transmission according to claim 17 characterized by said engageable means of said clutch collar comprising a plurality of dogs projecting towards said additional toothed member.

19. A transmission according to claim 18 characterized by said engageable means of said additional toothed member comprising recess means on the side of said additional toothed member facing said collar.

20. A transmission according to claim 17 characterized by another toothed member having engageable means facing toward said collar and engageable by an end of said key carrier.

21. A transmission according to claim 17 characterized by said moving means further comprising an annular groove in said collar, and a shifter fork having an edge portion extending into said groove.

22. A transmission according to claim 21 characterized by said housing having a slot therein and said shifter fork having projecting means extending through said slot.

23. A transmission according to claim 22 characterized further by a pawl carrier located outside said housing and having means engageable with said projecting means, and means for moving said pawl carrier along a path transverse to the path of said housing slot.

24. A transmission according to claim 23 characterized by said means engageable with said projecting means comprising a slot in said pawl carrier with which said projecting means extends, said pawl carrier slot being positioned transversely to said housing slot.

25. A transmission according to claim 17 characterized by said moving means comprises a shifter fork in said housing and having means extending outside said housing, a cover for said housing, movable shift means under said cover for moving said extending means, and a shift lever outside said cover and removably connected with said shift means.

26. A transmission according to claim 25 characterized by said shift lever being connected with said movable shift means through an opening in said cover.

27. A transmission according to claim 26 characterized by said movable shift means including a noncircular projection extending through said cover, and said shift lever having a noncircular opening cooperating with said projection.

28. A transmission according to claim 27 characterized by said shift lever being connected to said movable shift means by a threaded fastener.

* * * * *

UNITED STATES PATENT OFFICE
CERTIFICATE OF CORRECTION

PATENT NO. : 4,028,960

DATED : June 14, 1977

INVENTOR(S) : Hans Hauser and Ronald N. Jones

It is certified that error appears in the above-identified patent and that said Letters Patent are hereby corrected as shown below:

Column 1, line 23, for "removable" substitute --removably--.

line 29, for "th" substitute --the--.

Column 2, line 20, after "the" insert --line--.

Column 3, line 58, after "24" insert --by--.
line 60, for "112" substitute --122--.

Column 4, line 22, after "the" (first occurence) insert --pawl--.

line 31, after "52" insert --is--.

Column 5, line 37, after "output" insert --shaft--.
line 42, for "in" substitute --on--.

Column 7, line 18, for "grove" substitute --groove--, and for "received" substitute --receives--.

line 23, for "116" substitute --166--.

UNITED STATES PATENT OFFICE
CERTIFICATE OF CORRECTION

PATENT NO. : 4,028,960

DATED : June 14, 1977

INVENTOR(S) : Hans Hauser and Ronald N. Jones

It is certified that error appears in the above-identified patent and that said Letters Patent are hereby corrected as shown below:

Column 8, line 6, for "end" substitute --ends--.
line 18, for "seond" substitute --second--.

Column 9, line 24, for "havng" substitute --having--.

Column 10, line 4, after "clutch" insert --collar--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks